Dec. 30, 1952     R. G. DUNN ET AL     2,623,638
DEICING DEVICE FOR AIRCRAFT FUEL SYSTEMS
Filed Sept. 14, 1949     2 SHEETS—SHEET 1

INVENTORS,
ROBERT G. DUNN AND
ROBERT F. HEISER
BY Wade Koontz AND
Frederick W. Cotterman
ATTORNEYS

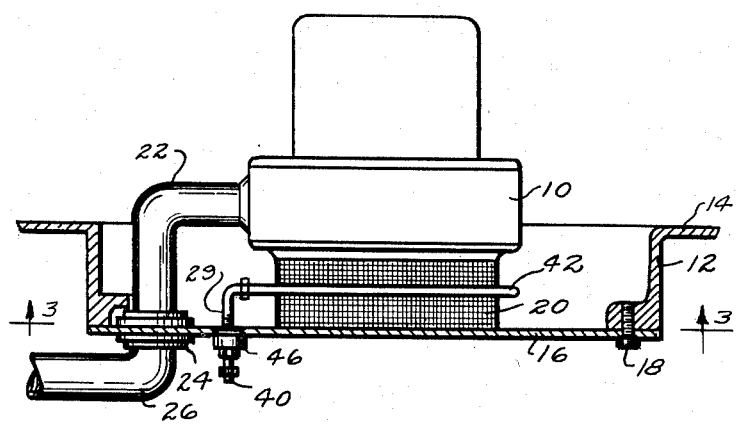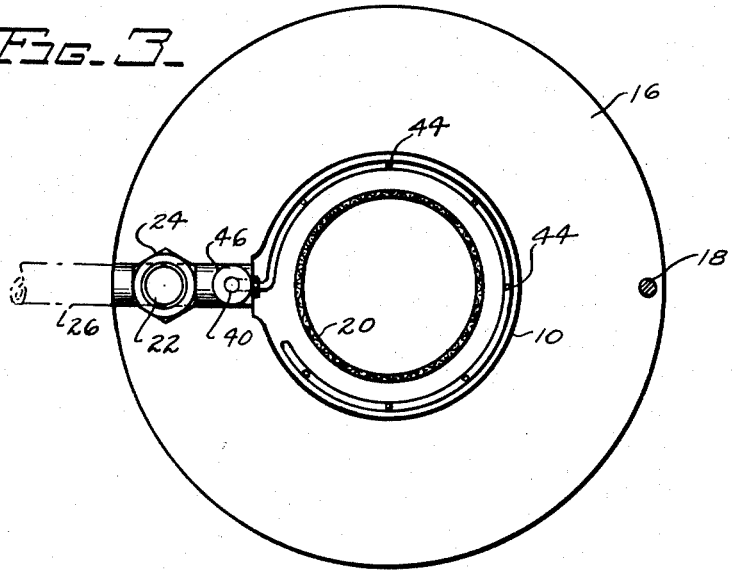

Patented Dec. 30, 1952

2,623,638

UNITED STATES PATENT OFFICE 2,623,638

DEICING DEVICE FOR AIRCRAFT FUEL SYSTEMS

Robert G. Dunn, Dayton, Ohio, and Robert F. Heiser, Valparaiso, Fla.

Application September 14, 1949, Serial No. 115,755

4 Claims. (Cl. 210—150)

(Granted under the act of March 3, 1883, as amended April 30, 1928; 370 O. G. 757)

The invention described herein may be manufactured and used by or for the Government for governmental purposes without payment to us of any royalty thereon.

This invention relates to a device for preventing the icing of the several filter screens normally interspersed in the fuel line of an aircraft fuel system.

The spraying of an antifreeze into the air chute or the carburetor intake of an aircraft engine to prevent undesirable ice formation in the carburetor air intake is old in the art. Here the evaporation of the liquid fuel spray causes a drop in the temperature of the intake air and, under certain conditions of temperature and humidity, the moisture in the air which is being drawn in is precipitated and deposited in the air passageway in the form of ice tending to restrict normal air flow.

In the course of their experimentation, however, applicants discovered that engine failure was less often due to restriction of the air induction line due to icing of the air chute or carburetor intake than to the icing up of the several filter screens in the fuel line where no appreciable amount of air is present from which water could be expected to be precipitated.

It is known, however, that after all of the free water content has been segregated and removed from a quantity of fuel, a small amount of water is retained in the fuel in solution, the amount depending on the temperature, i. e., as the temperature of the fuel is lowered, its capacity to retain water in solution is reduced, and the fuel will acquire a higher free water content. Apparently the water which is held in solution and which is forced out of solution as the temperature is lowered, freezes, forming minute ice particles which remain suspended for indefinite periods and which will ice up a screen of much larger openings than the particles themselves.

It has been suggested to add a percentage of antifreeze, preferably alcohol, in bulk to each tank of fuel. This procedure, however, seems only to intensify the problem for the reason that alcohol-fuel mixtures are capable of holding larger quantities of water in solution at any given temperature than the fuel alone, so that if the temperature of the fuel drops, due to a rapid rise in altitude, or for any other reason, the fuel gives up more of the water which is being held in solution so that there is more free water from which ice particles may be formed to clog up the screens than would have been the case with the fuel alone. Moreover, it is wasteful of antifreeze to infuse an entire tank of fuel when the entire tank may be consumed without encountering any freezing conditions.

It is therefore an object of this invention to provide a device whereby, when icing conditions prevail, a liquid antifreeze may be injected in the fuel line at a point where it may mix with the fuel and pass therewith as a fuel-antifreeze mixture through the several filter screens enroute to the engine, thereby to forestall icing up of the several filter screens through which it passes with a minimum quantity of antifreeze.

Other objects and advantages will be evident upon consideration of the following detailed description, reference being had to the drawing, wherein:

Fig. 2 is an elevational view partly in section of the fuel booster pump of Fig. 1 and its associate screen.

Fig. 3 is a bottom plan view of the booster pump shown in elevation in Fig. 2.

Like reference characters refer to like parts throughout the several views.

Figure 1:
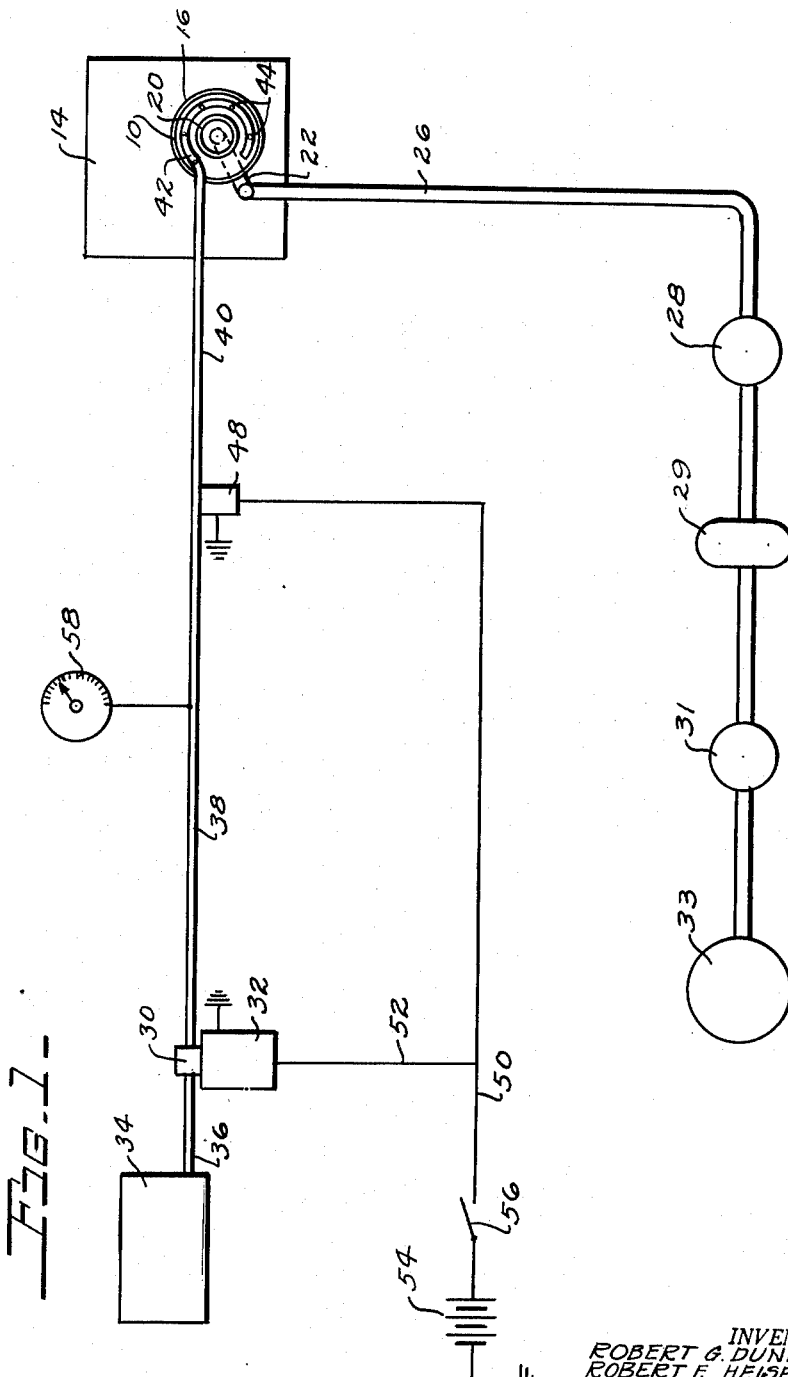
Fig. 1 is a diagrammatic representation of a fuel line to which an embodiment of our invention has been applied.

In the embodiment of our invention herein shown a booster pump 10 is submerged in the sump 12 of a fuel tank 14, the mounting plate 16 of the pump being held in place by screws 18. A screen 20 surrounds the pump inlet, the outlet 22 being sealed against fuel leakage where it passes through the mounting plate 16 by a packing joint 24.

Fuel under pressure flows from the pump 10 through the fuel line 26 then successively through a low pressure filter 28, engine pump 29, high pressure filter 31 and the carburetor or burner 33 or other device used in metering the fuel to the engine. The fuel system thus far shown and described is well known in the art and constitutes the basic structure with which our invention cooperates in producing a new result. The device which constitutes our invention will now be described.

In the schematic drawing Fig. 1, an antifreeze pump 30 driven by an electric motor 32 draws antifreeze liquid, such as ethyl or methyl alcohol from an antifreeze supply tank 34 by way of the suction line 36 and delivers it by way of the discharge line 38 and 40 to a manifold 42 which may be formed by bending a length of tubing similar to tubing 40 to circular form and drilling a series of small holes 44 in the underside, and which surrounds the base of the booster pump 10 and its inlet screen 20 through which all fuel which the booster pump takes from the fuel tank 14 must pass to the fuel line 26. The antifreeze line 40 is threaded in a hub 46 on the underside of the mounting plate 16 which supports the booster pump and its screen in the sump of the fuel tank 14. The manifold 42 surrounds the screen 20 at some distance therefrom and is supported in an elbow 29 which also is threaded in the hub 46. A valve 48 in the line 38, 40, is spring biased to closed position and is provided with a solenoid (not shown) for opening the valve and holding it open. Conductors 50, 52, convey current from a source 54 to both the motor 32 and the valve 48. A switch 56 connects the current to the motor and valve simultaneously.

Switch 56 is shown as being manually operable but obviously it could be operated by a mechanism responsive to a pressure difference on opposite sides of the screen 20 when the screen was becoming iced. A gauge 58 is provided to indicate the pressure in the line 38.

The fuel-antifreeze mixture which is pumped by the booster pump 10 from the fuel tank 14 and by the antifreeze pump 30 from the antifreeze tank 34, passes through the screen filter 20 and out through the fuel line 26 in which are interposed, in spaced relation, the low pressure filter 28, engine pump 29, high pressure filter 31 and the carburetor 33 or engine jet filter whichever is being used all of which are fortified against icing by the injection of the antifreeze into the fuel at a single point, i. e., through the booster pump inlet screen. It will be obvious, however, that where the booster pump screen 20 may be made of coarse enough mesh, say 20 mesh, so that there is practically no danger that this screen will ice up under any condition of usage, the antifreeze may be injected at a point between the booster pump and the low pressure screen, whereby the remaining instruments in the fuel line will be protected against icing.

Having described an embodiment of our invention, we claim:

1. In an aircraft fuel system comprising a fuel tank, a booster pump, and a screen interposed between the fuel in said fuel tank and the inlet opening of said booster pump, an improvement for said system which comprises an antifreeze pump, an antifreeze tank, means connecting the antifreeze tank to the suction side of said antifreeze pump, a manifold adjacent said screen upstream thereof, an antifreeze discharge line extending from the discharge side of said antifreeze pump to said manifold, and means to hold said manifold and said pump in fixed relation one to the other.

2. In an aircraft fuel system comprising a fuel tank, a booster pump within said fuel tank, and a screen enclosing the inlet opening of said booster pump, an improvement for said system which comprises an antifreeze pump, an antifreeze tank, conduit means connecting the antifreeze tank to the suction side of said antifreeze pump, a manifold surrounding said screen within said fuel tank, an antifreeze discharge line extending from the discharge side of said antifreeze pump to said manifold, and means to support said pump and said manifold in fixed relation, one to the other.

3. In an aircraft fuel system comprising a fuel tank, a booster pump having its inlet passageway submerged in fuel in said tank, and a cylindrical screen surrounding the inlet opening of said booster pump within said tank, an improvement for said system which comprises an antifreeze pump, an antifreeze tank, a suction line connecting the antifreeze tank to the suction side of said antifreeze pump, a tubular manifold encircling said cylindrical screen, an antifreeze discharge line extending from the discharge side of said antifreeze pump to and through said tubular manifold, and means to support said screen and said manifold in concentric relation, one to the other, and to said booster pump.

4. In an aircraft fuel system comprising a fuel tank, a booster pump in said tank having its inlet passageway submerged in the fuel in said tank, and a cylindrical screen in said tank surrounding the inlet opening of said booster pump, an improvement for said system which comprises an antifreeze tank, an antifreeze pump, an electric motor for driving said antifreeze pump, piping connecting said antifreeze tank to the suction side of said antifreeze pump, a tubular manifold encircling said cylindrical screen, an antifreeze discharge line extending from the discharge side of said antifreeze pump to said tubular manifold, an electrically operated valve in said discharge line, a source of electrical energy, a switch operable to connect said source to said motor and to said valve simultaneously, and means to maintain concentric relation between said pump, said screen, and said manifold.

ROBERT G. DUNN.
ROBERT F. HEISER.

REFERENCES CITED

The following references are of record in the file of this patent:

UNITED STATES PATENTS

| Number | Name | Date |
|---|---|---|
| 1,054,702 | Maranville | Mar. 4, 1913 |
| 2,172,882 | Watkins | Sept. 12, 1939 |
| 2,311,828 | Hansen et al. | Feb. 23, 1943 |
| 2,366,830 | Cannon et al. | Jan. 9, 1945 |
| 2,385,513 | Helvern et al. | Sept. 25, 1945 |